United States Patent [19]
Thandiwe et al.

[11] Patent Number: 6,072,250
[45] Date of Patent: Jun. 6, 2000

[54] BATTERY PACK HAVING A HIBERNATE CIRCUIT

[75] Inventors: Iilonga P. Thandiwe, Atlanta; James L. Estes, Jr., Lawrenceville; Theresa P. Szeto, Suwanee, all of Ga.

[73] Assignee: Motorola, Inc., Schaumburg, Ill.

[21] Appl. No.: 09/088,526

[22] Filed: Jun. 1, 1998

[51] Int. Cl.[7] .................................................. H02J 7/00
[52] U.S. Cl. ............................................................ 307/150
[58] Field of Search ................................. 429/48, 7, 52, 429/97; 307/150, 142

[56] References Cited

U.S. PATENT DOCUMENTS

| | | | |
|---|---|---|---|
| 4,202,935 | 5/1980 | Malcolm | 429/48 |
| 4,893,094 | 1/1990 | Herold et al. | 331/1 A |
| 5,251,179 | 10/1993 | Wittman | 365/227 |
| 5,594,319 | 1/1997 | Thandiwe | 320/2 |
| 5,645,949 | 7/1997 | Young | 429/7 |
| 5,762,512 | 6/1998 | Trant et al. | 439/347 |

*Primary Examiner*—Jeffrey Gaffin
*Assistant Examiner*—Roberto C. Rios
*Attorney, Agent, or Firm*—Felipe J. Farley; Philip Burrus

[57] ABSTRACT

A battery pack (100) includes a battery cell (102), a power switch (104), a regulator circuit (106), control circuit (108), electronic drive switch (112), and a mechanical driver switch (116). The battery pack is placed in the hibernate mode by sending a hibernate message to the control circuit from an external device (134). The control circuit removes a control signal from the electronic driver switch, causing the power switch to open, removing power from the regulator circuit and all attached circuitry, including the control circuit. No current flows from the battery cell past the opened power switch, and the battery pack is then in the hibernate mode. To wake up the battery pack, the mechanical driver switch is actuated by a user, causing the power switch to close, allowing current and voltage from the battery cell to power up the regulator circuit, which in turn powers up the control circuit. The control circuit applies a control signal to the electronic driver switch to hold the power switch closed.

8 Claims, 2 Drawing Sheets

BATTERY PACK HAVING A HIBERNATE CIRCUIT

TECHNICAL FIELD

This invention relates in general to rechargeable battery packs, and more particularly to circuits for reducing power consumption of battery circuitry.

BACKGROUND OF THE INVENTION

As electronic circuits are increasingly made smaller and more integrated, an increasing variety of portable products are made available. All of these portable electronic device, such as portable computers and cellular radio-telephones, for example, are powered by a battery or battery pack. Typically it is less costly to operate the device if the device is powered by a secondary or rechargeable battery or battery pack. This is because, while a secondary battery may only store half as much energy as a primary or single-use battery, it can be recharged hundreds of times, significantly reducing the operation cost compared to primary batteries.

At the same time, increasingly sophisticated devices are designed that optimize the usage of the battery. Circuits such as the so called battery fuel gauge are more common place. There is also a heightened awareness of safety, and safety circuitry is often included in the battery pack. This is especially true of battery packs using lithium ion cells, where strict voltage limits must be observed to both ensure performance and reduce safety hazards. Furthermore, it is becoming more commonplace to place a memory device inside the battery pack to store certain parameters, such as cycle count information, cell chemistry information, and so on.

As the amount and sophistication of circuitry in battery pack designs increase, there is a growing concern regarding the current drain of this circuitry. Current used by the battery pack circuitry reduces the amount of energy available to the host device for which the battery is designed to power. One facet of battery pack manufacture that is of particular concern with regard to battery pack circuit current drain is the period of time between when the battery pack is assembled and the time it is first charged by an end customer. During this time, which may be on the order of months, the circuitry in the battery pack will typically be consuming energy, resulting in the battery charge level continuously decreasing. If the charge level decreases too far, a condition referred to as over-discharged, the life cycle capability of the battery pack will likely be shortened. At an extreme, the battery pack may be significantly damaged, and unable to provide the full charge capacity it would otherwise be capable of delivering. This is particularly true in the case of a lithium ion battery pack.

In addressing this problem there are two main strategies. The first involves charging the batteries to a fully charged level immediately after manufacturing the battery pack, then, by effective business operation, minimizing the time from manufacture to sale to an end user. Second, the designer or designers of the battery pack use low current drain designs, and integrate circuits. Typically a manufacturer will employ a combination of these two strategies to minimize the chance of delivering a reduced capacity battery pack to a customer.

However, both strategies typically result in an increased cost of manufacture. Charging battery packs prior to shipment involves equipment and personnel. Integrating subcircuits usually requires the design of custom parts. Therefore, there is a need for a means to address the problem of battery pack circuit current drain between the time of manufacture and the time of delivery, as well as during long periods of storage.

DETAILED DESCRIPTION OF A PREFERRED EMBODIMENT

Figure 1:
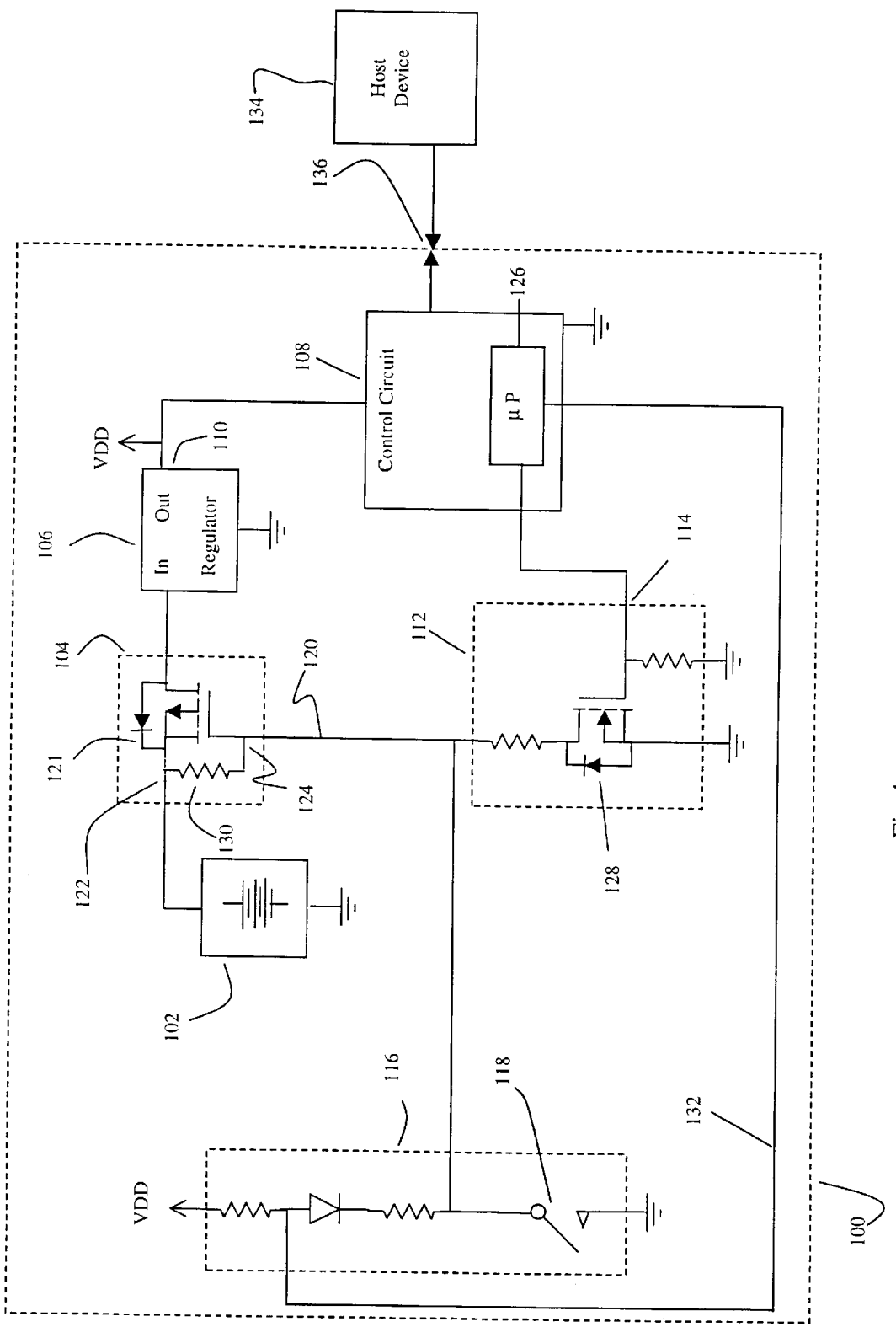
FIG. 1 shows a schematic diagram of a battery pack with a hibernate circuit, in accordance with the invention.

While the specification concludes with claims defining the features of the invention that are regarded as novel, it is believed that the invention will be better understood from a consideration of the following description in conjunction with the drawing figures, in which like reference numerals are carried forward.

The present invention solves the problem of battery pack current drain during idle periods, such as between the time of manufacture and the time of first use by an end user, by providing a circuit capable of placing the battery pack into a hibernate mode. In the hibernate mode the battery pack circuitry is cut off from the battery cells, thereby eliminating all current drain. A user actuated mechanical switch is provided so that the user can awaken the battery pack circuitry.

Referring now to FIG. 1, which shows a schematic diagram of a battery pack 100 having a hibernate circuit, in accordance with the invention. A battery cell core including at least one battery cell 102 is disposed within the battery pack to provide and store energy. The hibernate circuit comprises a power switch 104 coupled to the battery cells, and in between the battery cells and a regulator circuit 106, such as a voltage regulator circuit. A control circuit 108 is coupled to the regulator circuit at an output 110 of the regulator circuit. An electronic driver switch 112 is coupled to the power switch, and has a control input 114 coupled to the control circuit. A mechanical driver switch 116 is also coupled to the power switch, and has a normal state and an actuated state which occurs when a user presses a mechanical switch 118 of the mechanical driver switch.

The power switch has at least an open state and a closed state. In the open state no current can flow through the power switch, and in the closed state, the power switch presents a minimal amount of electrical impedance to the flow of current. The state of the power switch is determined by the voltage on line 120. In the preferred embodiment, the power switch includes a P-channel enhancement mode metallic oxide semiconductor field effect transistor (MOSFET) 121 having a source 122 and a gate 124. If the voltage at the gate of the MOSFET is substantially equal to the voltage at the source, the power switch will be in the open state. If the voltage at the gate, which is coupled to the control line 120, is pulled sufficiently below the voltage at the source, then the power switch will be in the closed mode. This type of MOSFET operation is well know in the art.

To illustrate how the hibernate circuit functions, assume that the power switch is in the open state. This is the hibernate mode. As such, no power is provided to the regulator circuit 106, and thus no power is provided to the control circuit 108. The control circuit may include any manner of battery pack circuitry used when the batter pack is in use, such as when ben charged or when powering a device, and in the preferred embodiment comprises a microprocessor 126. As the microprocessor is powered by the regulator circuit, all of its outputs are floating or grounded while the, power switch is open. The microprocessor is coupled to the control input 114 of the electronic driver switch by such an output In the preferred embodiment, the electronic driver switch, like the power switch, includes a MOSFET 128, but an N-channel MOSFET. Thus, when the microprocessor is not applying a control signal to the control input, as is the case during the hibernate mode, the electronic driver switch does not conduct current, and the voltage on the control line 120 is pulled up to that of the source by a pull up resistor 130. Thus the condition that the power switch is open is satisfied.

Awakening the battery pack from the hibernate mode to the normal mode occurs when, during the hibernate mode, a user actuates the mechanical driver switch. In practice, the mechanical switch 118 is mounted within the battery pack, and has an actuator accessible by the user, such as through an opening in a housing of the battery pack, for example. Upon actuating the mechanical driver switch, the control line voltage level is pulled down to substantially the ground or reference potential, causing the power switch to close, allowing voltage and current from the battery cells to be applied to the regulator circuit, which begins providing power to the control circuit. The regulator circuit is preferably a voltage regulator circuit, such as a linear regulator or a buck switching regulator, and provides a regulated voltage level to the control circuit. Upon powering up the control circuit, a control signal is asserted at the control input of the electronic driver switch, allowing it to conduct, thus holding the control line voltage level sufficiently low to hold the power switch in the closed state. The step of asserting the control signal by the control circuit can be routinely accomplished by programming the microprocessor to do so upon power up. Thus, even when the user releases the mechanical switch, the power switch will stay in the closed state, and the battery pack will then be in its normal mode.

During normal operation, the mechanical driver switch may serve another purpose. By connecting an interrupt line 132 between the control circuit and the mechanical switch such that the interrupt line is at a non-active level when the mechanical driver switch is in the normal state, and at an active level when the mechanical driver switch is actuated, the control circuit can receive a signal from the user to perform an activity, such as, for example, display a fuel gauge indication on a display means from a battery fuel gauge circuit included in the control circuit, as is well known in the art. To do so, the mechanical driver switch would need to be connected to the output of the regulator circuit by at least a resistor. The specific arrangement of circuit elements would be determined routinely as a matter of engineering choice, depending on the particular application, Once in the normal mode, it may be desirable to place the battery pack in the hibernate mode. There are two instances when this is desirable. First, at the factory where the battery pack is manufactured, prior to shipping the battery pack, and second, when the user of the battery pack plans to not use the battery pack for an extended period of time. To place the battery pack in the hibernate mode, an external host device 134 is interfaced with the control circuit. This may be done over a bus connected to the microprocessor. The host device may be, for example, a device the battery pack provides electrical power for, or a test fixture used in a factory for testing the battery pack. The host device sends a hibernate message to the control circuit over the interface 136. Upon receiving the hibernate message, the control circuit removes the control signal from the electronic driver switch. This is performed in the preferred embodiment by charging a logic level of 1 to a logic level of 0 at the control input of the electronic driver switch. The electronic diver switch then opens, causing the power switch to open, and the battery pack is put into the hibernate mode.

Figure 2:
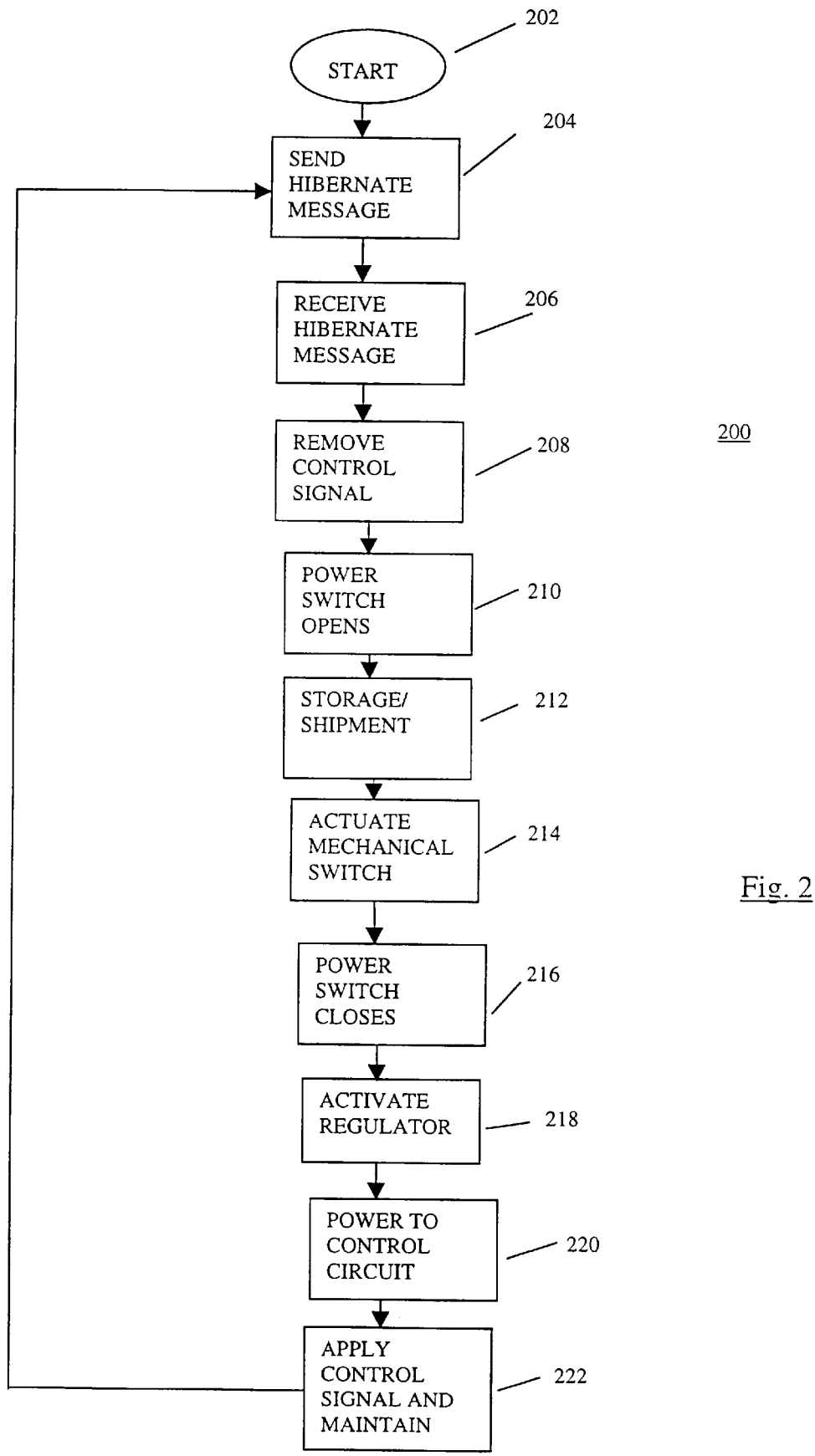
FIG. 2 shows a flow chart diagram of a method for operating a battery pack having a hibernate circuit, in accordance with the invention.

The method, performed in part by the hibernate circuit, for transitioning the battery pack between normal and hibernate modes is shown in FIG. 2. Referring now to FIG. 2, there is shown a flow chart diagram 200 of a method for operating a battery pack having a hibernate circuit, in accordance with the invention. At the start 202 the battery pack is either being prepared for an extended period of non-use, such as when shipping the battery pack after manufacture thereof. The hibernate mode is initialized by sending a hibernate message to the battery pack from an external device. Receiving the hibernate message 206 is performed by the control circuit, which goes about removing the control signal 208 from the electronic driver switch. In response, opening of the power switch 210 occurs. The battery pack is then in hibernate mode, and ready for storage/shipment 212. Once in possession of the end user, the user performs the step of actuating the mechanical switch 214 disposed on the battery pack. In response, switching the power switch 216 from the open state to the closed state occurs. Once the power switch is closed, activating of the regulator circuit 218 happens, providing power to the control circuit 220. Upon powering up the control circuit, the control circuit begins applying the control signal 222 to the electronic driver switch, and continues maintaining the power switch in the closed state to keep the battery pack in the normal mode.

Thus, the invention provides a means to place a battery pack in a hibernate mode to eliminate unnecessary current drain during inactive periods. The invention further provides for a means of switching the battery pack between a normal mode and the hibernate mode, and vice-versa. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack having a hibernate mode and a normal mode, comprising:

at least one battery cell;

a power switch coupled to at least one battery cell, the power switch operable in at least an open and a closed state;

a regulator circuit coupled to the power switch and having an output;

a control circuit coupled to the output of the regulator circuit;

an electronic driver switch coupled to the power switch and having a control input coupled to the control circuit, the electronic driver switch for holding the battery pack in the normal mode while a control signal is present at the control input, and for placing the battery pack in hibernation mode upon removal of the control signal, the control signal provided by the control circuit; and a mechanical driver switch coupled to the power switch and having a normal state and an actuated state for causing a battery pack to change from the hibernation mode to the normal mode;

whereby the battery pack may be placed in either hibernate or normal mode more than one time.

2. A battery pack as defined in claim 1, wherein the power switch comprises a MOSFET having a pull up resistor coupled between a source and a gate of the MOSFET.

3. A battery pack as defined in claim 1, wherein the regulator circuit comprises a voltage regulator circuit.

4. A battery pack as defined in claim 1, wherein the control circuit comprises a microprocessor having an interface for receiving a hibernate message, the microprocessor having an output coupled to the control input of the electronic driver switch for providing the control signal thereto, and wherein the microprocessor provides the control signal until receiving the hibernate message over the interface.

5. A battery pack as defined in claim 1, wherein the electronic driver switch comprises a MOSFET, and wherein the control input is a gate of the MOSFET.

6. A battery pack as defined in claim 1, wherein the mechanical driver switch operates a battery fuel gauge when the battery pack is in the normal mode.

7. A method for placing the battery pack in a normal mode into a hibernate mode, the method comprising the steps of:

sending a hibernate message to the battery pack from an external device;

receiving the hibernate message at a control circuit within the battery pack;

removing a control signal from an electronic driver switch, performed by the control circuit; and opening an electronic driver switch, thereby opening a power switch coupled between a battery cell core and a regulator circuit in response to the removing of the control signal, thereby removing power from the control circuit.

8. A method of waking up a battery pack from a hibernate mode, comprising the steps of:

actuating a mechanical switch disposed on the battery pack;

switching a power switch disposed between a battery cell and a regulator circuit from an open state to a closed state in response to performing the step of actuating;

activating the regulator circuit in response to the performing the step of switching;

providing power from a battery cell to a control circuit, performed by the regulator circuit in response to performing the step of activating;

applying a control signal to an electronic driver switch coupled to the power switch, performed by the control circuit in response to performing the step of providing; and maintaining the power switch in a closed state in response to the step of applying.

* * * * *